(12) United States Patent
Lingafelt et al.

(10) Patent No.: US 7,007,169 B2
(45) Date of Patent: Feb. 28, 2006

(54) METHOD AND APPARATUS FOR PROTECTING A WEB SERVER AGAINST VANDALS ATTACKS WITHOUT RESTRICTING LEGITIMATE ACCESS

(75) Inventors: Charles Steven Lingafelt, Durham, NC (US); John Joseph McKenna, Cary, NC (US); Robert Barry Sisk, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 942 days.

(21) Appl. No.: 09/826,046

(22) Filed: Apr. 4, 2001

(65) Prior Publication Data

US 2002/0147925 A1 Oct. 10, 2002

(51) Int. Cl.
*H04L 9/00* (2006.01)
*G06F 11/30* (2006.01)

(52) U.S. Cl. .................... 713/188; 713/163; 713/193; 713/201

(58) Field of Classification Search ........ 713/152–154, 713/188, 201, 163, 193, 200, 202; 380/250, 380/1; 709/223–225, 229, 240; 714/38, 714/763; 705/18; 708/135; 710/36
See application file for complete search history.

(56) References Cited

U.S. PATENT DOCUMENTS

| 5,757,924 | A | | 5/1998 | Friedman et al. ............ 380/49 |
|---|---|---|---|---|
| 5,826,014 | A | * | 10/1998 | Coley et al. ................. 713/201 |
| 5,884,025 | A | * | 3/1999 | Baehr et al. ................. 713/201 |
| 5,892,903 | A | | 4/1999 | Klaus ..................... 395/187.01 |
| 6,052,788 | A | * | 4/2000 | Wesinger et al. ........... 713/201 |
| 6,078,665 | A | | 6/2000 | Anderson et al. ............. 380/28 |
| 6,363,489 | B1 | * | 3/2002 | Comay et al. .............. 713/201 |
| 6,598,167 | B1 | * | 7/2003 | Devine et al. .............. 713/201 |
| 6,615,358 | B1 | * | 9/2003 | Dowd et al. ................. 713/201 |
| 6,735,702 | B1 | * | 5/2004 | Yavatkar et al. ............ 713/201 |

FOREIGN PATENT DOCUMENTS

WO 9948303 9/1999

* cited by examiner

*Primary Examiner*—Kambiz Zand
(74) *Attorney, Agent, or Firm*—John R. Pivnichny; David R. Irvin; Greenblum & Bernstein

(57) ABSTRACT

An intrusion detection security system (IDSS) guards a server against vandals' attacks such as denial of service, distributed denial of service, and common gateway interface attacks. An incoming source address is compared with the contents of a database of privileged addresses. If the incoming address is present in the database, the IDSS instructs protective equipment such as a firewall or router to allow the incoming message to pass to the web server despite any ongoing attack, thus allowing messages from customers or suppliers, for example, through. Otherwise, the IDSS checks a database of blocked addresses. When the incoming address is absent, the IDSS writes the address to the database of blocked addresses and instructs the protective equipment to block subsequent messages from the incoming address.

10 Claims, 3 Drawing Sheets

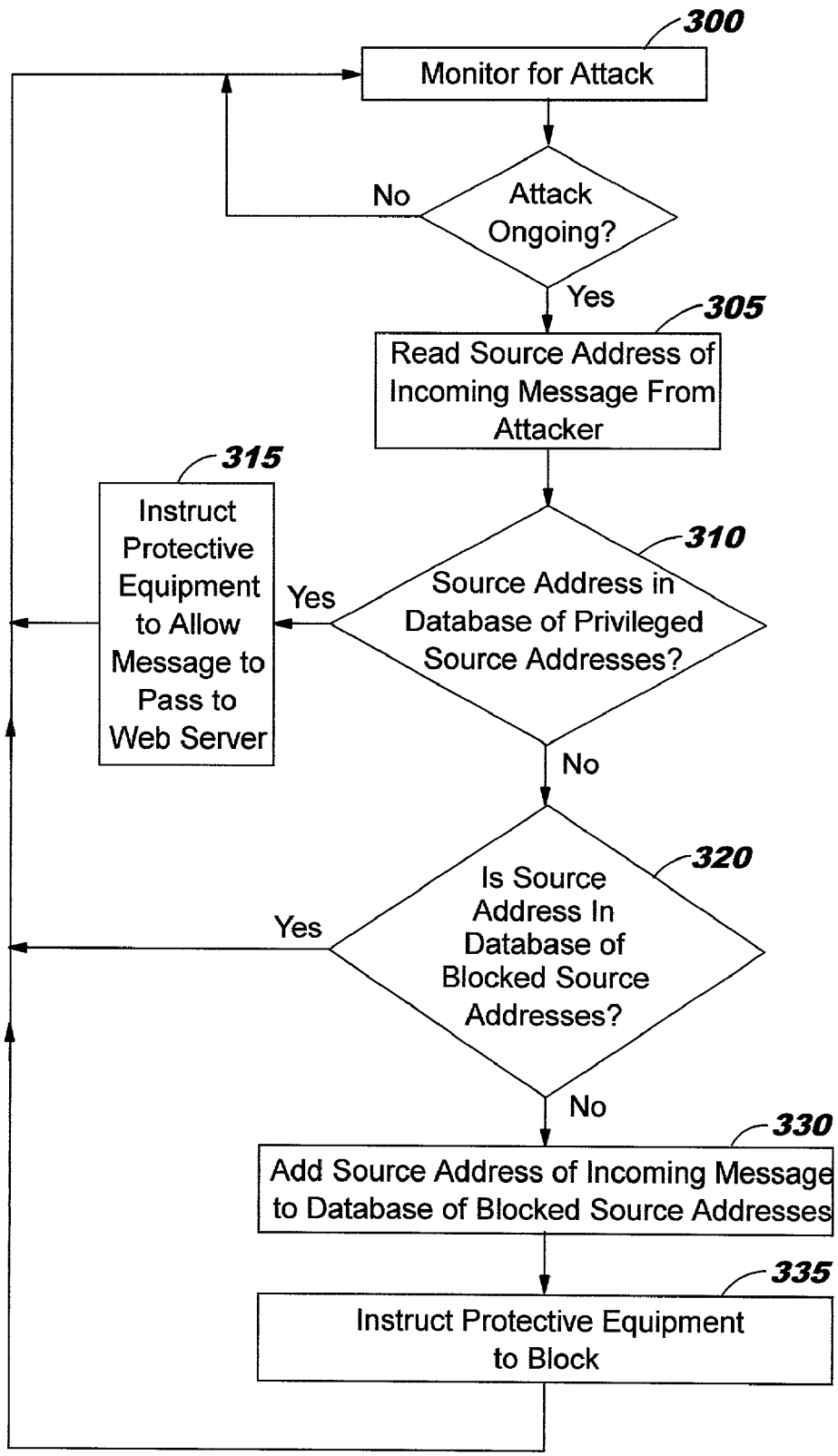

METHOD AND APPARATUS FOR PROTECTING A WEB SERVER AGAINST VANDALS ATTACKS WITHOUT RESTRICTING LEGITIMATE ACCESS

FIELD OF THE INVENTION

The present invention is related to the field of servers, and more particularly the present invention is related to, but not limited to, a method and apparatus for protecting a server such as an Internet web that supports electronic commerce from vandals' attacks without restricting legitimate use of the server.

BACKGROUND

Internet-based activities are now subject to electronic vandalism. For example, a vandal or hacker may attack an Internet web server by flooding it with a torrential flow of disruptive messages that overload the server to the point of functional failure. Attacks of this kind are called "denial of service" attacks.

During a denial of service attack, the vandal may fraudulently assume a number of different electronic identities, often by including messages in the disruptive flow that have a variety of source addresses. To combat such attacks, a server may rely upon protective equipment that filters incoming messages. Such equipment detects the onslaught of a vandal's attack, reads the source addresses that the attacker usurps and fraudulently re-uses, and blocks all messages that purport to originate from these source addresses.

Unfortunately, the use of protective filtering may play into the hands of a vandal who resorts to "spoofing." A spoofer is an attacker who uses a source address that fraudulently identifies the spoofer as a source that is already known to the server. Spoofing attacks may have serious consequences, for example when the spoofer usurps the source address of a web server's most important customer. In such instances, the web server's protective equipment filters-out all messages that bear the customer's source address, including messages actually sent by the customer. Consequently, the web server experiences both the trauma of an attack and the adverse consequences that come with mounting a defense that filters-out legitimate messages sent by the server's most important customer.

Thus there is a need for a defense against vandals who spoof and who launch denial-of-service attacks against a server, where the defense does not restrict legitimate use of the server.

SUMMARY OF THE INVENTION

By enabling messages from privileged sources to pass to a server despite the ongoing presence of a vandal's electronic attack, the present invention improves the operation of protective equipment such as firewalls and routers that guard the server against vandalism.

Upon detecting the launch of an attack by a vandal, an intrusion detection security system (IDSS) reads the source address of an incoming message that is part of a disruptive flow of messages sent by the vandal to the server. The IDSS compares the source address of the incoming message with the contents of a database of privileged source addresses, for example the source addresses of customers or suppliers that are known to a web server that supports electronic commerce.

When the source address of the incoming message is present in the database of privileged source addresses, the IDSS instructs the protective equipment to allow the incoming message to pass to the server, despite the vandal's ongoing attack. When the source address of the incoming message is not present in the database of privileged source addresses, the IDSS compares the source address of the incoming message to the contents of a database of blocked source addresses.

When the source address of the incoming message appears in the database of blocked source addresses, no further action is needed, as the protective equipment already knows to block the incoming message. When the source address of the incoming message does not appear in the database of blocked source addresses, the IDSS adds the source address of the incoming message to the database of blocked source addresses, and instructs the protective equipment to block the present incoming message and all subsequent incoming messages having the same source address, so that these messages do not reach the server.

When the IDSS detects that the attack has ceased, the IDSS removes the source address used by the attacker from the database of blocked source addresses, and instructs the protective equipment to unblock the source address just removed.

With the present invention, protective equipment may thus guard a server such as an electronic-commerce web server against attack by a vandal without denying legitimate access to the server. These and other aspects of the present invention will be more fully appreciated when considered in light of the following detailed description and drawings.

BRIEF DESCRIPTION OF THE DRAWINGS

FIG. 3 is a flowchart showing aspects of the operation of the structure of FIG. 1.

DETAILED DESCRIPTION OF THE INVENTION

The present invention improves the performance of equipment that protects a server from attack by vandals. Even during an attack, the protective equipment, as improved by the present invention, allows messages from privileged sources such as known customers to pass on through to the web server.

The description that follows is phrased in the language of a web server that supports electronic commerce. The present invention is not limited in its application to such web servers, however, and applies instead to all kinds of servers, including video servers, audio servers, FTP servers, and so forth, as well as to other kinds of devices, broadly including any device that is an IP-addressable, network-connected device. Consequently, in the description and in the claims that follow, the term "web server" is used as a matter of convenience only, and the term "web server" is to be interpreted broadly as any IP-addressable, network-connected device.

Figure 1:
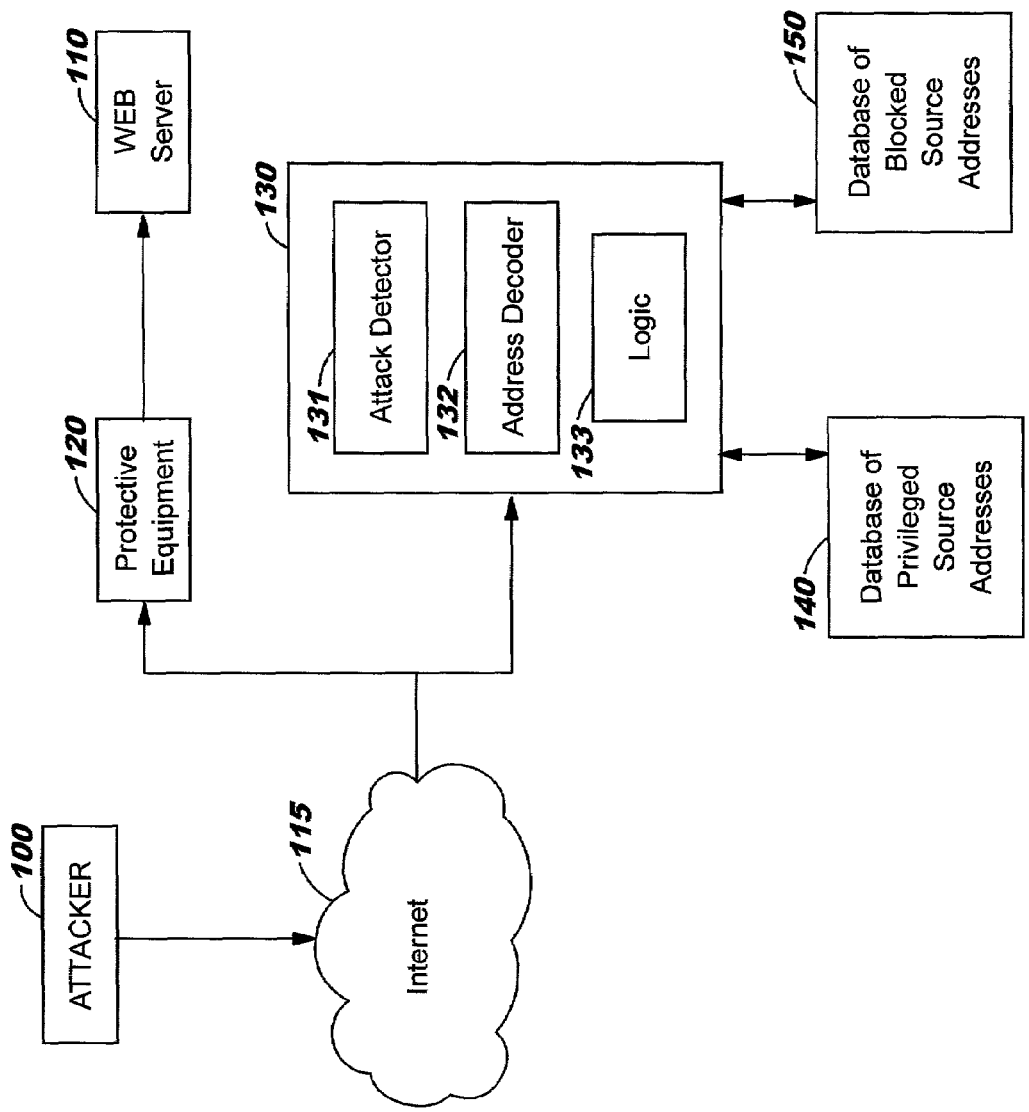
FIG. 1 is a diagram showing aspects of a structure that protects a server from attack by a vandal.

As shown in FIG. 1, a vandal or attacker 100 may attempt to gain access to a web server 110 through the Internet 115 or another communication network. In the context of the present invention, attacks may include denial of service (DoS) attacks such as bandwidth attacks and connectivity attacks, distributed denial of service (DDoS) attacks, targeted common gateway interface (CGI) attacks, HTTP-based attacks, and so forth.

To combat attacks, protective equipment 120 guards the web server 110. Often, the protective equipment 120 is part of a router or a firewall. Using methods known to those skilled in the art, an attack detector 131 detects the presence of disruptive message flows that threaten the web server 110. The attack detector 131 may reside within the protective equipment 120, or within an intrusion detection security system 130, or elsewhere in the structure of FIG. 1. The attack detector 131 is operably associated with an address decoder 132, which reads the address of a message from the disruptive flow.

Figure 2:
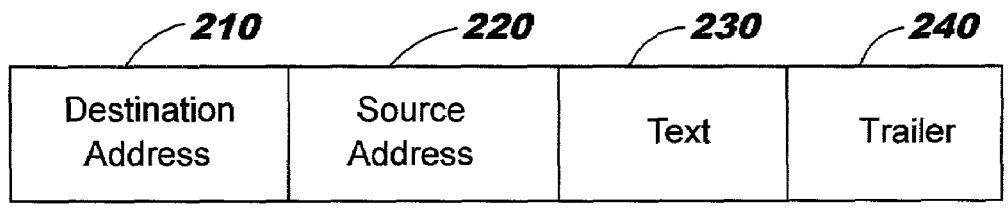
FIG. 2 shows an exemplary message directed toward the server of FIG. 1.

An exemplary format for a message from a disruptive flow is shown in FIG. 2. The message 200 may include a destination address 210 which may be the address of the web server 110, a source address 220 which purports to identify the sender of the message but which may be subject to spoofing, a text 230, and a trailer 240. For a disruptive flow passing over the Internet 115, the address decoder 132 reads the source address 220 of the message, which may be the source Internet Protocol (IP) address.

Upon commencement of an attack, the attack detector 131 notifies the protective equipment 120 to block the disruptive flow from attacker 100, for example by instructing the protective equipment 120 to filter out the particular source address 220 read by the address decoder 132, i.e., to block messages having this address from reaching the web server 110.

The present invention includes a database of privileged source addresses 140 and a database of blocked source addresses 150, both of which may be accessed through logic 133 in the intrusion detection security system 130 (use of the databases is described below). The purpose of the database of privileged source addresses 140 is to contain source addressees of messages that the protective equipment 120 is to allow to pass through to the web server 110 even despite an ongoing attack by the attacker 100. Source addresses contained in the database of privileged source addresses 140 may include source addresses of known customers, service providers, network management entities, and so forth. The purpose of the database of blocked source addresses is to contain the source addresses filtered out or blocked by the protective equipment 120.

Although the database of privileged source addresses 140 and the database of blocked source addresses 150 are shown in FIG. 1 as two separate databases, they may be combined into a single database, and may be accessed whether combined or not by the protective equipment 120 as well as by the logic 133 within the intrusion detection security system 130. For example, the intrusion detection security system 130 and the protective equipment 120 might share a common database of blocked source addresses 150.

FIG. 3 shows aspects of the operation of the structure of FIG. 1. As shown in FIG. 3, the attack detector 131 monitors for the onset of an attack (step 300). When an attack is detected, the address decoder 132 reads the source address 220 of an incoming message 200 sent by the attacker 100 (step 305). The logic 133 within the intrusion detection security system 130 then accesses the database of privileged source addresses 140 and determines whether or not the source address 220 of the incoming message 200 is present (step 310).

When the source address 220 is present in the database of preferred source addresses 140, the logic 133 instructs the protective equipment 120 to allow the incoming message 200 to pass through to the web server 110 despite the attack (step 315), and the attack detector 131 resumes monitoring for an attack (step 300). Otherwise (i.e., the source address 220 of the incoming message 200 is not present in the database of preferred source addresses 140), the logic 133 within the intrusion detection security system 130 accesses the database of blocked source addresses 150 and determines whether or not the source address 220 of the incoming message 200 is present therein (step 320).

When the source address 220 of the incoming message 200 is present in the database of blocked source addresses 150, the attack detector 131 resumes monitoring for an attack (step 300). Otherwise (i.e., the source address 220 is not present in the database of blocked source addresses 150), the logic 133 adds the source address 220 to the database of blocked source addresses 150 (step 330), and instructs the protective equipment 120 to block or filter-out the message 200 and subsequent messages bearing the source address 220 of the incoming message 200 until instructed otherwise (step 335). Instructions to the protective equipment 120 may be explicit, or they may be implicit from database entries when the database of blocked source addresses 150 is shared by the intrusion detection security system 130 and the protective equipment 120. The attack detector 131 resumes monitoring for an attack (step 300).

Once the attack subsides, the source address 220 employed by the attacker 100 may be removed from the database of blocked source addresses 150, and the protective equipment 120 may be instructed to cease blocking messages that bear the source address 220 formerly employed by the attacker.

From the foregoing description, those skilled in the art will appreciate that the present invention improves the performance of equipment that protects a web server from electronic attack by a vandal, by allowing messages from known customers or suppliers to pass through the protective equipment in order to reach the web server despite the ongoing presence of an attack by the vandal. Although the invention has been described for convenience in the language of a web server that supports electronic-commerce, the is not limited in its application to such web servers, however, and applies instead to all kinds of servers, including video servers, audio servers, FTP servers, and so forth, as well as to other kinds of devices, broadly including any device that is an IP-addressable, network-connected device. Consequently, in the claims that follow, the term "web server" is used as a matter of convenience only, and the term "web server" is to be interpreted broadly as any IP-addressable, network-connected device. The foregoing description is illustrative rather than limiting, and the scope of the present invention is limited only by the following claims.

We claim:

1. A method for improving the operation of equipment used to protect a web server against attack, comprising the acts of:

reading a source address of a message received during an attack;

checking a database of privileged source addresses; and instructing protective equipment for a web server to pass the received message to the web server, regardless of an ongoing attack, when the source address of the received message matches an address contained in the database of privileged source addresses;

when the source address of the received message does not appear in the database of privileged source addresses, checking a database of blocked source addresses; and when the source address of the received message does not appear in the database of blocked source addresses, adding the source address of the received message to the database of blocked source addresses.

2. The method of claim 1, wherein the database of privileged source addresses includes a source address of a customer known to the web server.

3. The method of claim 1, wherein the database of privileged source addresses includes a source address of a user known to the web server.

4. A method for improving the operation of equipment used to protect a web server against attack by a vandal, comprising the acts of:
  reading a source address of a message received during an attack;
  checking a database of privileged source addresses for appearance of the source address of the received message;
  when the source address of the received message appears in the database of privileged source addresses, instructing protective equipment to pass the received message to a web server;
  when the source address of the received message does not appear in the database of privileged source addresses, checking a database of blocked source addresses for appearance of the source address of the received message; and
  when the source address of the received message does not appear in the database of blocked source addresses, adding the source address of the received message to the database of blocked source addresses and instructing the protective equipment to block the received message and to block subsequent messages that bear the source address of the received message.

5. Protective equipment for guarding a web server against attack, comprising:
  an address decoder for reading a source address of a message received during an attack;
  a database of privileged source addresses;
  a database of blocked source addresses; and
  logic for instructing protective equipment for a web server to pass the message received during the attack to the web server when the source address of the message received during the attack matches a privileged source address contained in the database of privileged source addresses, regardless of an ongoing attack;
  when the source address of the received message does not appear in the database of privileged source addresses, checking the database of blocked source addresses; and
  when the source address of the received message does not appear in the database of blocked source addresses, adding the source address of the received message to the database of blocked source addresses.

6. The protective equipment as set forth in claim 5, wherein the database of privileged source addresses includes a source address of a customer known to access the web server.

7. The protective equipment as set forth in claim 5, wherein the database of privileged source addresses includes a source address of a known user of the web server.

8. Protective equipment for guarding a web server against attack, comprising:
  an address decoder for reading a source address of a message received during an attack;
  a database of privileged source addresses, which passes a packet containing a privileged source address to the web server regardless of an ongoing attack;
  a database of blocked source addresses; and
  logic for checking the database of privileged source addresses and the database of blocked source addresses for appearance of the source address of the message received during the attack and, responsive to the appearance, instructing protective equipment to block incoming messages that bear the source address of the message received during the attack;
  when the source address of the received message does not appear in the database of privileged source addresses, checking the database of blocked source addresses; and
  when the source address of the received message does not appear in the database of blocked source addresses, adding the source address of the received message to the database of blocked source addresses.

9. Protective equipment for guarding a web server against attack, comprising:
  an address decoder for reading a source address of a message received during an attack;
  a database of privileged source addresses;
  a database of blocked source addresses; and
  logic for:
    checking the database of privileged source addresses for appearance of the source address of the received message;
    when the source address of the received message appears in the database of privileged source addresses, instructing protective equipment to pass the received message to a web server, regardless of an ongoing attack;
    when the source address of the received message does not appear in the database of privileged source addresses, checking the database of blocked source addresses for appearance of the source address of the received message; and
    when the source address of the received message does not appear in the database of blocked source addresses, adding the source address of the received message to the database of blocked source addresses and instructing the protective equipment to block the received message and to block subsequent messages that bear the source address of the received message.

10. A method for improving the operation of equipment used to protect a web server against attack, comprising the acts of:
  reading a source address of a message received during an attack;
  checking a database of privileged source addresses;
  instructing protective equipment for a web server to pass the received message to the web server, regardless of an ongoing attack, when the source address of the received message matches an address contained in the database of privileged source addresses;
  detecting cessation of the attack;
  removing one or more source addresses used by an attacker from a database of blocked source addresses; and
  unblocking the one or more source addresses just removed.

* * * * *